United States Patent
Tagawa et al.

(10) Patent No.: US 11,647,761 B2
(45) Date of Patent: May 16, 2023

(54) FILTER UNIT, GAS SUPPLY DEVICE, INSIDE AIR CONDITIONER, AND COOLING DEVICE FOR CONTAINER

(71) Applicant: DAIKIN INDUSTRIES, LTD., Osaka (JP)

(72) Inventors: Hirotaka Tagawa, Osaka (JP); Kazuyasu Matsui, Osaka (JP); Makoto Ikemiya, Osaka (JP)

(73) Assignee: DAIKIN INDUSTRIES, LTD., Osaka (JP)

( * ) Notice: Subject to any disclaimer, the term of this patent is extended or adjusted under 35 U.S.C. 154(b) by 601 days.

(21) Appl. No.: 16/630,935

(22) PCT Filed: Jul. 20, 2018

(86) PCT No.: PCT/JP2018/027332
§ 371 (c)(1),
(2) Date: Jan. 14, 2020

(87) PCT Pub. No.: WO2019/017485
PCT Pub. Date: Jan. 24, 2019

(65) Prior Publication Data
US 2020/0229454 A1    Jul. 23, 2020

(30) Foreign Application Priority Data
Jul. 21, 2017   (JP) .............................. JP2017-142278

(51) Int. Cl.
*A23B 7/148* (2006.01)
*A23B 7/04* (2006.01)
(Continued)

(52) U.S. Cl.
CPC ................ *A23B 7/148* (2013.01); *A23B 7/04* (2013.01); *B01D 46/0002* (2013.01);
(Continued)

(58) Field of Classification Search
CPC .................. F25D 11/003; F25D 23/00; F25D 2323/0024; B01D 46/0002; B01D 2279/50
See application file for complete search history.

(56) References Cited

U.S. PATENT DOCUMENTS

2016/0245555 A1    8/2016   Tanaka et al.
2017/0336128 A1*  11/2017   de Cavalcanti ....... F25D 17/042
2018/0213808 A1    8/2018   Kamei et al.

FOREIGN PATENT DOCUMENTS

JP        2308-267780 A    11/2008
JP           6022724 B1    11/2016
(Continued)

OTHER PUBLICATIONS

International Search Report, issued in PCT/JP2018/027332, PCT/ISA/210, dated Oct. 9, 2018.

*Primary Examiner* — Joseph F Trpisovsky
(74) *Attorney, Agent, or Firm* — Birch, Stewart, Kolasch & Birch, LLP

(57) ABSTRACT

A space which is present between an air intake surface (90a) provided with an air intake port and an air filter (76) is regarded as a primary space (P) through which air flows into the air filter (76), and a plurality of spaces, each of which is present between one of other surfaces of the air filter (76) and a filter box (90), are regarded as secondary spaces (Q) into each of which the air flows out from the air filter (76), so that the air is taken out from side surfaces and an upper surface of a filter unit (75). This configuration reduces the increase in size of the filter unit (75) of a gas supply device (30) even if a dust holding capacity of the filter is made larger than before.

11 Claims, 11 Drawing Sheets

(51) Int. Cl.
*B01D 46/10* (2006.01)
*F25D 23/00* (2006.01)
*B01D 46/00* (2022.01)
*F25D 11/00* (2006.01)

(52) U.S. Cl.
CPC ............ *B01D 46/10* (2013.01); *F25D 11/003* (2013.01); *F25D 23/00* (2013.01); *A23V 2002/00* (2013.01); *B01D 2279/50* (2013.01); *F25D 2323/0024* (2013.01)

(56) References Cited

FOREIGN PATENT DOCUMENTS

| | | |
|---|---|---|
| JP | 2017-44445 A | 3/2017 |
| JP | 2017-180900 A | 10/2017 |

\* cited by examiner

DIRECTION OF AIR

FILTER UNIT, GAS SUPPLY DEVICE, INSIDE AIR CONDITIONER, AND COOLING DEVICE FOR CONTAINER

TECHNICAL FIELD

The present disclosure relates to a filter unit, a gas supply device including the filter unit and an air pump provided in a gas passage that supplies gas to a target space, an inside air control system that supplies a gas mixture generated in the gas supply device and having a high nitrogen concentration and a low oxygen concentration to the target space, and a container refrigeration apparatus equipped with the inside air control system.

BACKGROUND ART

Container refrigeration apparatuses including a refrigerant circuit performing a refrigeration cycle have been used to cool air in a container for use in, e.g., marine transportation (see, e.g., Patent Document 1). The container is loaded with plants such as bananas and avocados, for example. Plants breathe by absorbing oxygen in the air and releasing carbon dioxide even after they have been harvested. The plants lose their nourishment and moisture as they breathe. Thus, the degree of freshness of the plants decreases. Thus, the oxygen concentration in the container is preferably lowered not to cause breathing problems.

Patent Document 1 discloses an inside air control system. In this inside air control system, an adsorbent which adsorbs a nitrogen component in the air when pressurized is used to produce nitrogen-enriched air (gas mixture) having a lower oxygen concentration and a higher nitrogen concentration than the air, and this nitrogen-enriched air is supplied into the container to reduce the oxygen concentration of the air in the container, making it easier to reduce the amount of breathing of the plants and to keep the plants fresh. This inside air control system performs an adsorption operation of sending pressurized air using an air pump into an adsorption column housing the adsorbent to allow the adsorbent to adsorb the nitrogen component, and then performs a desorption operation of sucking the air using the air pump from the adsorption column to allow the adsorbent to desorb the nitrogen component adsorbed. As a result, the nitrogen-enriched air is produced.

Components of the inside air control system are housed in a sealed unit case, and the inside air control system configured as a single unit is disposed in an external space of the container refrigeration apparatus. A filter unit provided at an air inlet is disposed separately from the inside air control system, and is connected to the inside air control system with an air hose. The filter unit is provided with a membrane filter, which is covered with a sheet metal cover so that water is not directly applied thereto. The filter unit is mounted on a casing of a container refrigeration apparatus.

CITATION LIST

Patent Document

Patent Document 1: Japanese Unexamined Patent Publication No. 2017-044445

SUMMARY OF THE INVENTION

Technical Problem

In the conventional inside air control system, a filter of the filter unit needs to be replaced every voyage because of its short life. One of possible measures to allow the filter to be used for a long period of time is increasing the size of the filter to give the filter with a larger dust holding capacity. However, this may increase the size of the filter unit, making it difficult to install the filter unit in the casing of the container refrigeration apparatus.

The problem of the increase in size of the filter unit is not limited to the inside air control system of the container refrigeration apparatus installed in a marine container, but may also arise in a gas supply device having components such as a pump and a valve for feeding the air through the filter into a warehouse or the like installed in a coastal area.

An object of the present disclosure is to suppress increase in size of the filter unit even if the dust holding capacity of the filter is made larger than before.

Solution to the Problem

A first aspect of the present disclosure is premised on a filter unit including a filter box (90) and an air filter (76) housed in the filter box (90).

In this filter unit, the air filter (76) is arranged to be spaced apart from wall surfaces of the filter box (90), and an air intake port (93) is formed in an air intake surface (90a), which is one of surfaces of the filter box (90). A space which is present between the air intake surface (90a) provided with the air intake port (93) and an air inflow surface of the air filter (76) corresponding to the air intake surface (90a) is a primary space (P) through which the air flows into the air filter (76), and a plurality of spaces, each of which is present between one of surfaces of the air filter (76) other than the air inflow surface and an associated one of the wall surfaces of the filter box (90) are secondary spaces (Q) into each of which the air flows out from the air filter (76).

In the first aspect, the air flows from the primary space (P) into the air filter (76) through the air intake port (93) formed in the air intake surface (90a) of the filter box (90), and flows out from the air filter (76) into the secondary spaces (Q).

A second aspect is an embodiment of the first aspect. In the second aspect, the air intake port (93) is formed near a lower end of the air intake surface (90a) of the filter box (90).

In the second aspect, the air flows into the filter box (90) through the air intake port (93) formed in the lower portion of the filter box (90).

A third aspect is an embodiment of the second aspect. In the third aspect, the air intake surface (90a) is provided with an intake port cover (94) covering the air intake port (93). The intake port cover (94) includes a front cover plate (94a) opposed to the air intake surface (90a), and a peripheral cover plate (94b) formed on a peripheral edge of the front cover plate (94a). A ventilation hole (95) is formed in the peripheral cover plate (94b) below the air intake port (93).

A fourth aspect is an embodiment of the third aspect. In the fourth aspect, the front cover plate (94a) of the intake port cover (94) is rectangular, and has a lower side inclined with respect to a horizontal line, and the ventilation hole (95) is formed in a predetermined range of a portion of the peripheral cover plate (94b) formed along the lower side of the front cover plate (94a), the predetermined range being near a lower end of the peripheral cover plate (94b).

In the third and fourth aspects, the air flows from the ventilation hole (95) of the intake port cover (94) into the filter box (90) through the air intake port (93).

A fifth aspect is an embodiment of any one of the first to fourth aspects. In the fifth aspect, the filter box (90) includes a front wall (90b) forming the air intake surface (90a), sidewalls (90s) positioned on the left and right sides of the air filter (76), an upper wall (90u) positioned above the air filter (76), and a bottom wall (90b) positioned below the air filter (76), and at least one of the sidewalls (90s), the upper wall (90u), and the front wall (90f) is provided with an air outflow port (85a) through which the air is taken out from the secondary spaces of the air filter (76).

In the fifth aspect, the air flows into the filter box (90) through the front wall (90f) thereof, which is the air intake surface (90a), and then flows out from the air outflow port (85a) cut in the sidewall (90s), the upper wall (90u), and the front wall (90f). Since the bottom wall (90b) has no air outflow port (85a), water, if accumulated in the filter box (90), does not flow into the air pump (31) and the target space (S).

A sixth aspect is an embodiment of any one of the first to fifth aspects. In the sixth aspect, the filter box (90) includes a back wall (91) facing a back surface of the air filter (76), and a spacer (96) is provided to form a communication passage (G) between the back surface of the air filter (76) and the back wall (91) of the filter box (90).

In the sixth aspect, the plurality of secondary spaces (Q) around the air filter (76) communicate with each other through the communication passage (G) formed between the back surface of the air filter (76) and the back wall (91) of the filter box (90). The secondary spaces (Q) communicate with each other even if the clearance between the back surface of the air filter (76) and the back wall (91) of the filter box (90) is small to make the filter box (90) thin. Thus, the air that has flowed out from the air filter (76) can flow from an arbitrary position around the air filter (76) to the air pump (31).

A seventh aspect is premised on a gas supply device, including: a gas passage (40) that supplies air to a target space (S); a filter unit (75) provided at an inlet of the gas passage (40); and an air pump (31) provided in the middle of the gas passage (40).

The filter unit is the filter unit (75) of any one of the first to sixth aspects of the present disclosure.

An eighth aspect is premised on an inside air control system, including: a gas supply device (30); and a gas mixture generator (38) that generates a gas mixture having a higher nitrogen concentration and a lower oxygen concentration than air sucked through a filter unit (75) of the gas supply device (30).

In this inside air control system, the gas supply device (30) is the gas supply device (30) of the seventh aspect, and configured to supply gas generated by the gas mixture generator (38) to the target space (S) using the air pump (31).

A ninth aspect is premised on a container refrigeration apparatus, including: a casing (12) mounted on a container (11); components of a refrigerant circuit (20) attached to the casing (12); and an inside air control system (60) attached to the casing (12), wherein the container refrigeration apparatus is configured to cool an internal space (S) of the container (11), and supply a gas mixture to the internal space (S) of the container (11) using the inside air control system (60).

In this container refrigeration apparatus, the inside air control system (60) is the inside air control system (60) of the eighth aspect.

Advantages of the Invention

According to the first aspect, the air flows from the primary space (P) into the air filter (76) through the air intake port (93) formed in the air intake surface (90a) of the filter box (90), and flows out from the air filter (76) into the secondary spaces (Q). In this aspect, suppose one of the surfaces of the air filter (76) facing the primary space (P) is a front surface, the air flows out from the side surfaces, upper surface, lower surface, or back surface of the air filter (76). Thus, the air that has flowed out can flow in an arbitrary direction. Therefore, if the filter box (90) is configured to allow the air to flow into the filter box (90) through the front surface and flow out from the filter box (90) through the side surfaces, the air does not flow toward the back side of the filter box (90) even if the air passage area of the air filter (76) is increased to increase the dust holding capacity. This can make the filter box (90) thinner, and can reduce the increase in size of the filter unit (75).

According to the second aspect, the air flows into the filter box (90) through the air intake port (93) formed in the lower portion of the filter box (90). In this aspect, water, if accumulated in the filter box (90), flows out from the air intake port (93) opened in the lower portion of the filter box (90). Thus, water does not accumulate to the level above the air intake port (93). This can reduce the increase in pressure loss caused by water that adheres to the air filter (76). Moreover, this can also reduce the thickness of the filter box (90).

According to the third aspect, the air flows from the ventilation hole (95) of the intake port cover (94) into the filter box (90) through the air intake port (93). In this aspect, provision of the intake port cover (94) suppresses the flow of water into the filter box (90). Further, in this aspect, water, if accumulated in the filter box (90), flows from the air intake port (93) opened in the lower portion of the filter box (90) and goes outside through the ventilation hole (95) formed in the intake port cover (94). Thus, water does not accumulate to the level above the air intake port (93). This can reduce the increase in pressure loss caused by water that adheres to the air filter (76). Moreover, this can also reduce the thickness of the filter box (90).

According to the fourth aspect, the air flows from the ventilation hole (95) of the intake port cover (94) into the filter box (90) through the air intake port (93). In this aspect, provision of the intake port cover (94) suppresses the flow of water into the filter box (90). Further, in this aspect, water, if accumulated in the filter box (90), flows from the air intake port (93) opened in the lower portion of the filter box (90) and goes outside through the ventilation hole (95) formed in the inclined lower side of the intake port cover (94). Thus, water does not accumulate to the level above the air intake port (93). This can reduce the increase in pressure loss caused by water that adheres to the air filter (76). Moreover, this can also reduce the thickness of the filter box (90).

According to the fifth aspect, the air flows into the filter box (90) through the front wall (90f) thereof, which is the air intake surface (90a), and then flows out from the air outflow port (85a) cut in the sidewall (90s), the upper wall (90u), or the front wall (90f). Since the bottom wall (90b) has no air outflow port (85a), water, if accumulated in the filter box (90), does not flow into the air pump (31) and the target space (S). This can protect the air pump (31) and the contents of the target space (S) from damage caused by water.

According to the sixth aspect, the air that has flowed out of the air filter (76) can flow from an arbitrary position around the air filter (76) to the air pump (31), and the filter box (90) can be thinned down. Such a configuration can be realized by merely providing a spacer (96) between the back surface of the air filter (76) and the back wall (91) of the filter box (90).

According to the seventh aspect, the gas supply device (30) can obtain the advantages of the first to sixth aspects. According to the eighth aspect, the inside air control system (60) can obtain the advantages of the first to sixth aspects. Further, according to the ninth aspect, the container refrigeration apparatus can obtain the advantages of the first to sixth aspects.

DESCRIPTION OF EMBODIMENTS

Embodiments will be described in detail with reference to the drawings. The present embodiment relates to a container refrigeration apparatus equipped with an inside air control system including a gas supply device according to the present disclosure. Note that the following description of the embodiment is merely an example in nature, and is not intended to limit the scope, applications, or use of the present disclosure.

Figure 1:
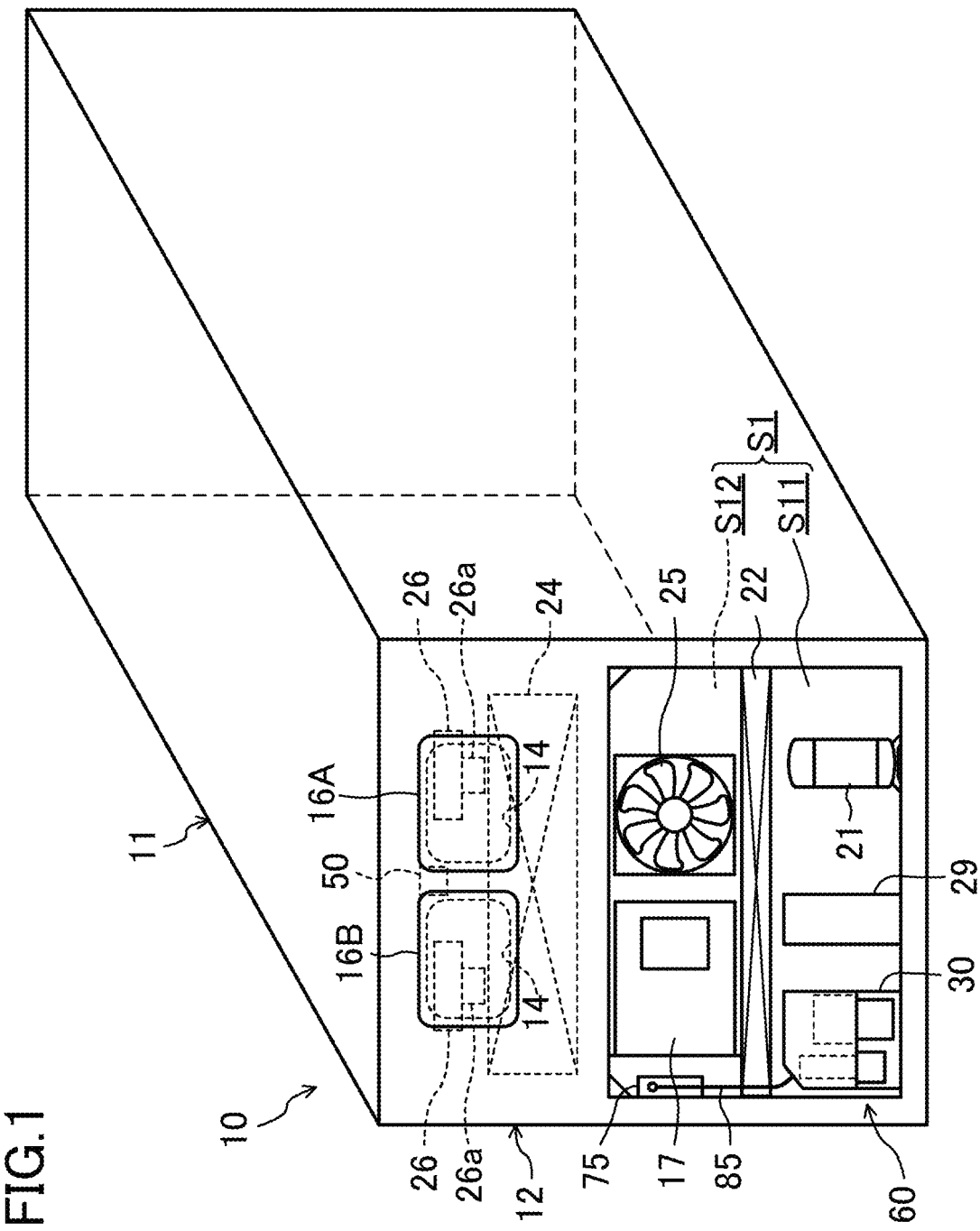
FIG. 1 is a perspective view illustrating a container refrigeration apparatus according to an embodiment as viewed from outside.
Figure 2:
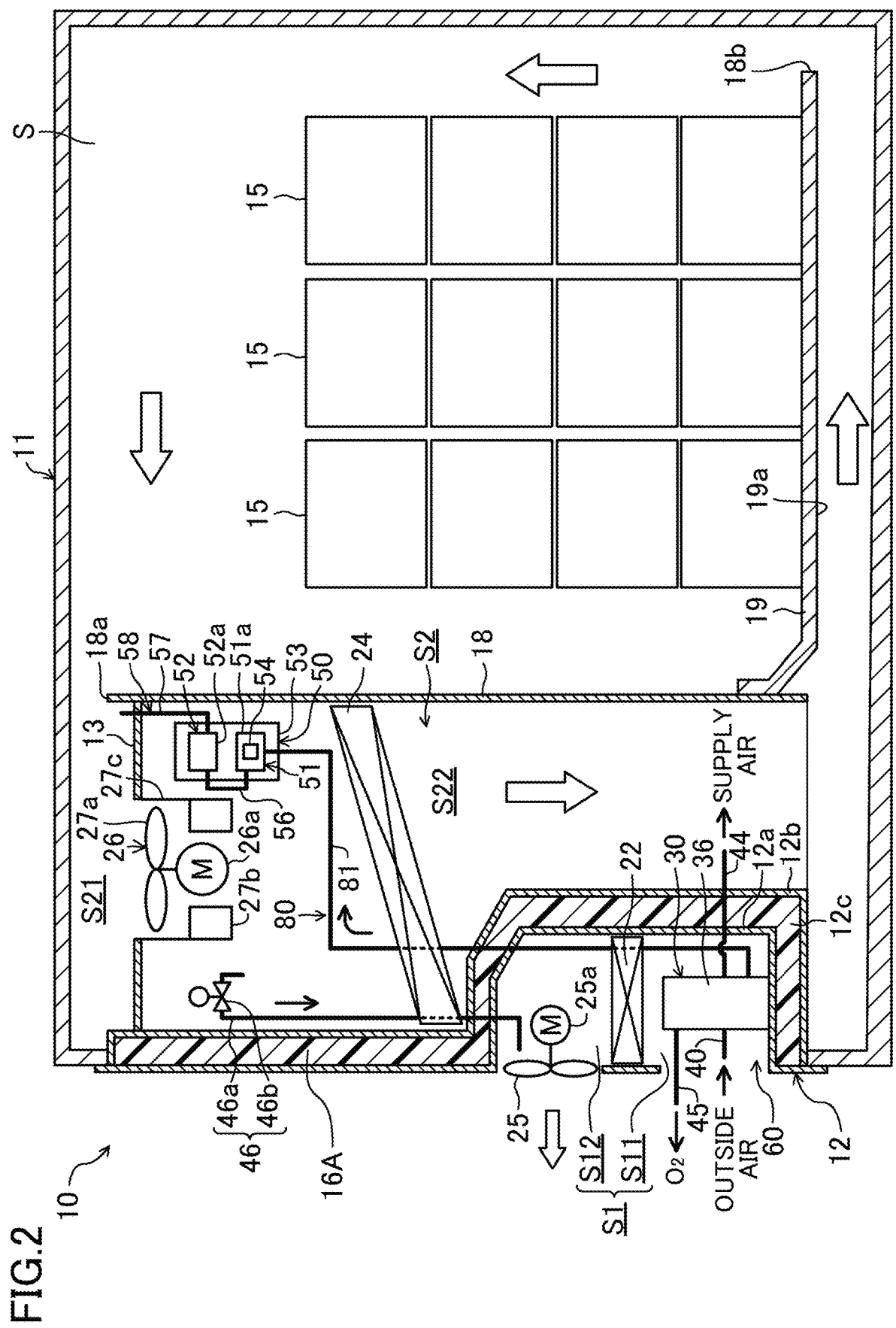
FIG. 2 is a sectional side view illustrating a general configuration of a container refrigeration apparatus.

As shown in FIGS. 1 and 2, a container refrigeration apparatus (10) is provided for a container (11) for use in, e.g., marine transportation, and cools the air in the container (11). Boxed plants (15) are stored in an internal space (target space) (S) of the container (11). The plants (15) breathe by absorbing oxygen ($O_2$) in the air and releasing carbon dioxide ($CO_2$) into the air, and examples of such plants (15) include fruit like bananas and avocados, vegetables, cereals, bulbous plants, and natural flowers.

The container (11) has the shape of an elongate box with an open end surface. The container refrigeration apparatus (10) includes a casing (12), a refrigerant circuit (20), and a controlled atmosphere (CA) system (inside air control system) (60), and is attached to close the open end of the container (11).

<Casing>

As shown in FIG. 2, the casing (12) includes an exterior wall (12a) disposed outside the container (11), and an interior wall (12b) disposed inside the container (11). The exterior and interior walls (12a) and (12b) may be made of an aluminum alloy, for example.

The exterior wall (12a) is attached to the periphery of the opening of the container (11) so as to close the open end of the container (11). The exterior wall (12a) is formed such that the lower part of the exterior wall (12a) protrudes into the container (11).

The interior wall (12b) is disposed to face the exterior wall (12a). The interior wall (12b) protrudes into the container just like the lower part of the exterior wall (12a). A thermal insulator (12c) fills the space between the interior and exterior walls (12b, 12a).

As can be seen, the lower part of the casing (12) is formed to protrude into the container (11). Thus, an external storage space (S1) is formed outside the container (11) and in the lower part of the casing (12), and an internal storage space (S2) is formed inside the container (11) and in the upper part of the casing (12).

As shown in FIG. 1, the casing (12) includes two access openings (14) for maintenance arranged side by side in a width direction of the casing (12). The two access openings (14) are closed respectively by first and second access doors (16A, 16B) which are openable and closable. Each of the first and second access doors (16A, 16B) includes, just like the casing (12), an exterior wall, an interior wall, and a thermal insulator.

As shown in FIG. 2, a partition plate (18) is disposed in the interior of the container (11). This partition plate (18) is formed in the shape of a substantially rectangular plate member, and stands upright so as to face the wall of the casing (12) inside the container (11). This partition plate (18) separates the internal storage space (S2) from the internal space (S) of the container (11).

A suction port (18a) is formed between the upper end of the partition plate (18) and a ceiling surface of the container (11). Air in the container (11) is taken into the internal storage space (S2) through the suction port (18a).

The internal storage space (S2) is further provided with a partition wall (13) extending in the horizontal direction. The partition wall (13) is attached to an upper end portion of the partition plate (18), and has an opening in which internal fans (26), which will be described later, are disposed. This partition wall (13) partitions the internal storage space (S2) into a primary space (S21) on the suction side of the internal fans (26), and a secondary space (S22) on the blowout side of the internal fans (26). In this embodiment, the partition wall (13) divides the internal storage space (S2) lengthwise in two spaces such that the primary space (S21) on the suction side is disposed above the secondary space (S22) on the blowout side.

A floorboard (19) is disposed in the container (11) with a gap left between the floorboard (19) and the bottom surface of the container (11). Boxed plants (15) are placed on the floorboard (19). An underfloor path (19a) is formed between the floorboard (19) and the bottom surface of the container (11). A gap is left between the lower end of the partition plate (18) and the bottom surface of the container (11), and communicates with the underfloor path (19a).

A blowout port (18b) through which the air which has been cooled by the container refrigeration apparatus (10) is blown into the internal space (S) of the container (11) is provided at an end of the floorboard (19) opposite from the open end of the container (11) (on the right side in FIG. 2).

<Configuration and Arrangement of Refrigerant Circuit and Other Components>

Figure 3:
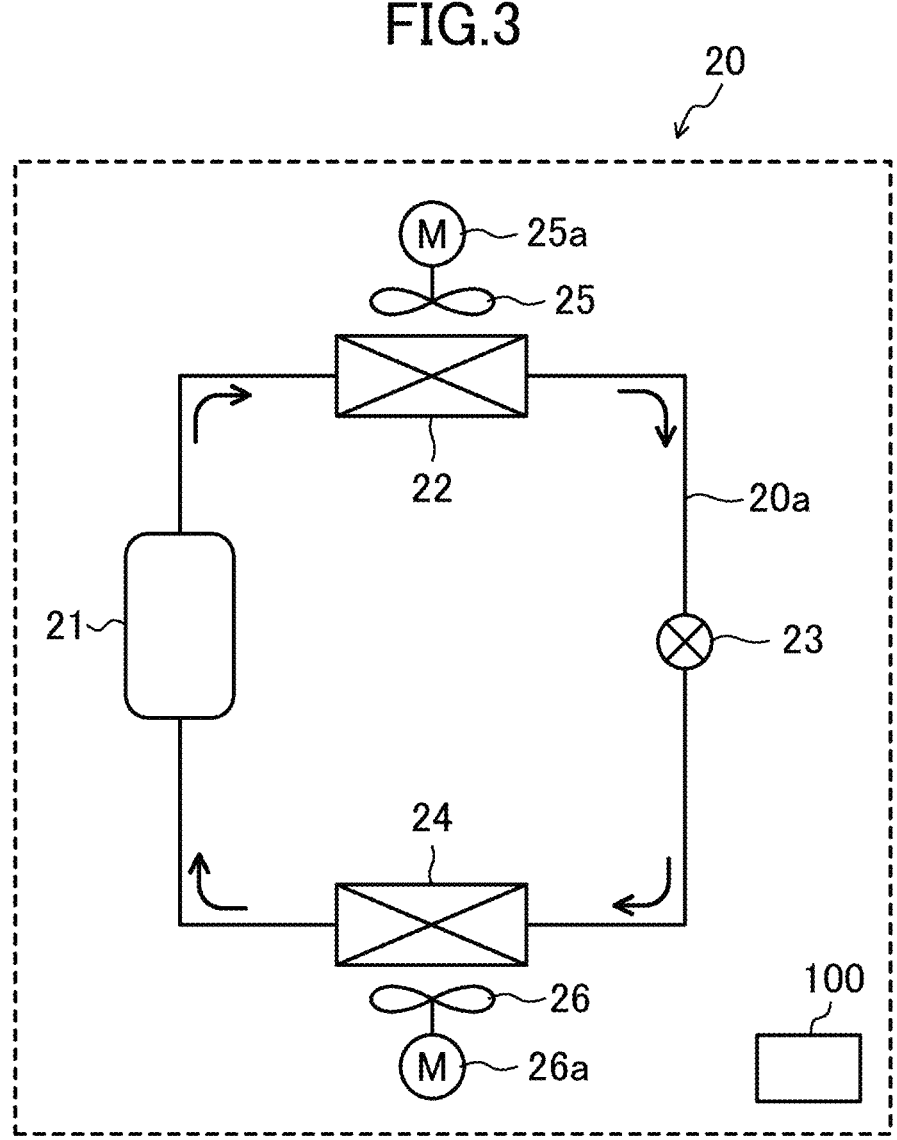
FIG. 3 is a piping system diagram illustrating a configuration of a refrigerant circuit of the container refrigeration apparatus.

As shown in FIG. 3, the refrigerant circuit (20) is a closed circuit in which a compressor (21), a condenser (22), an expansion valve (23), and an evaporator (24) are connected together in this order by a refrigerant piping (20a).

An external fan (25) is disposed near the condenser (22). The external fan (25) is driven in rotation by an external fan motor (25a), guides the air in the external space of the container (11) (i.e., outside air) into the external storage space (S1), and sends it to the condenser (22). In the condenser (22), heat is exchanged between a refrigerant compressed in the compressor (21) and flowing through the condenser (22) and the outside air sent to the condenser (22) by the external fan (25). In this embodiment, the external fan (25) is comprised of a propeller fan.

Two internal fans (26) are disposed near the evaporator (24). The internal fans (26) are driven in rotation by internal fan motors (26a), draw the air in the container (11) through the suction port (18a), and blow the air toward the evaporator (24). In the evaporator (24), heat is exchanged between a refrigerant having a pressure dropped by the expansion valve (23) and flowing through the evaporator (24) and the air in the container sent to the evaporator (24) by the internal fans (26).

As shown in FIG. 2, each of the internal fans (26) includes a propeller fan (rotary vane) (27a), a plurality of stationary vanes (27b), and a fan housing (27c). The propeller fan (27a) is coupled to the internal fan motor (26a), and driven in rotation by the internal fan motor (26a) about a rotation axis to blow the air in an axial direction. The plurality of stationary vanes (27b) are disposed on the blowout side of the propeller fan (27a) to rectify the flow of swirling air blown from the propeller fan (27a). The fan housing (27c) is comprised of a cylindrical member with the plurality of stationary vanes (27b) attached to its inner peripheral surface, and extends to, and surrounds, the outer periphery of the propeller fan (27a).

As shown in FIG. 1, the compressor (21) and the condenser (22) are housed in the external storage space (S1). The condenser (22), located in the middle of the external storage space (S1) in the vertical direction, divides the external storage space (S1) into a lower first space (S11) and an upper second space (S12). In the first space (S11), the compressor (21), an inverter box (29) which houses a driver circuit for driving the compressor (21) at a variable velocity, and a gas supply device (30) of the CA system (60) are disposed. The external fan (25) and an electric component box (17) are disposed in the second space (S12). The first space (S11) is open toward the external space of the container (11). A plate member is arranged to close the second space (S12) from the external space of the container such that only a blowout port of the external fan (25) is open toward the external space of the container.

As shown in FIG. 2, the evaporator (24) is housed in the secondary space (S22) of the internal storage space (S2). The two internal fans (26) are disposed above the evaporator (24) in the internal storage space (S2) and arranged side by side in the width direction of the casing (12).

<CA System>

Figure 4:
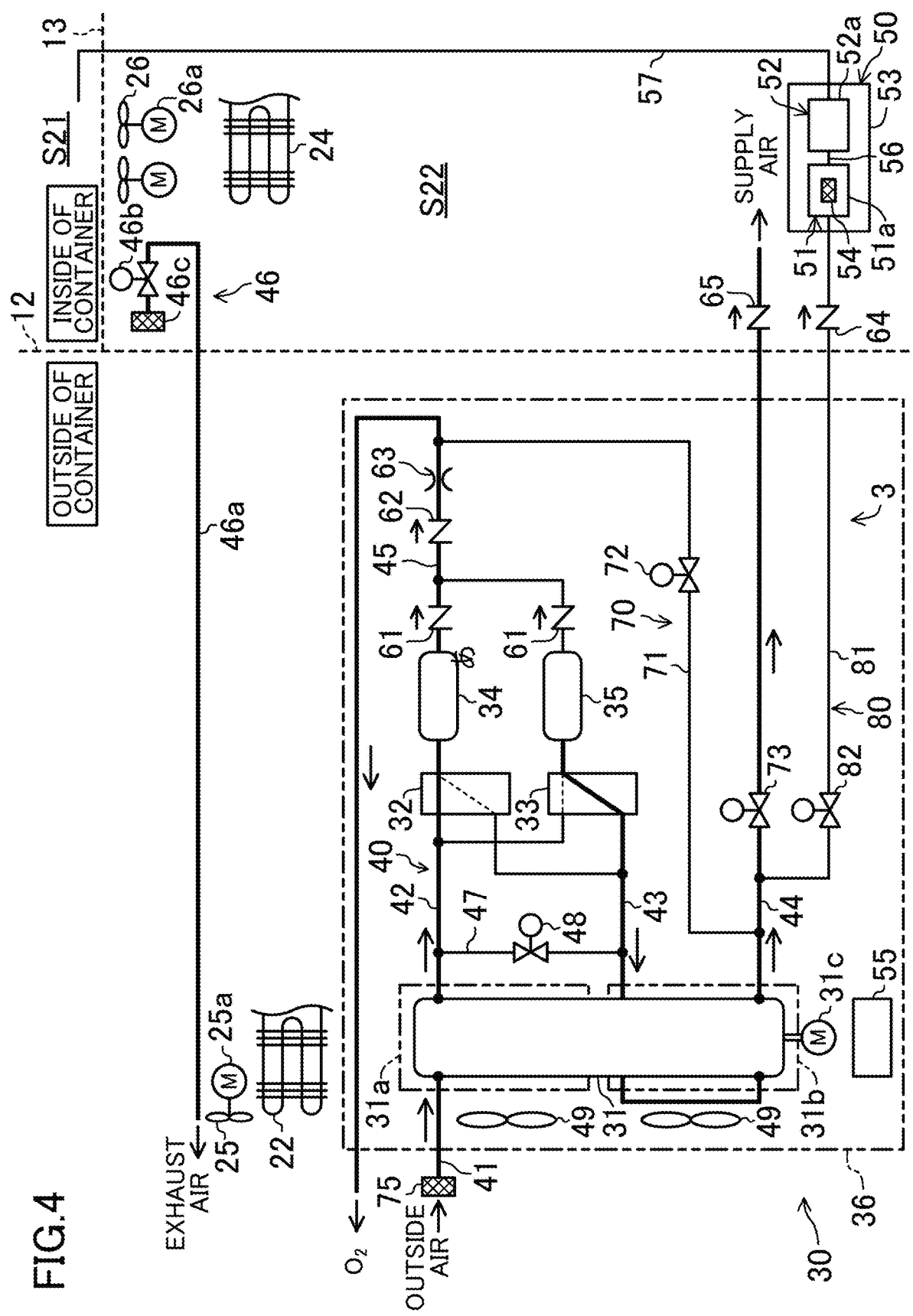
FIG. 4 is a piping system diagram illustrating a configuration of a CA system of the container refrigeration apparatus, together with the flow of air during a first operation.

As shown in FIG. 4, the CA system (60) includes the gas supply device (30), an exhaust portion (46), a sensor unit (50), a controller (55), and a filter unit (75), and controls the oxygen concentration and carbon dioxide concentration of the air in the container (11). The term "concentration" to be used in the following description always indicates a "volumetric concentration."

[Gas Supply Device]

—Configuration of Gas Supply Device—

The gas supply device (30) sucks the air (gas) from the filter unit (75), and feeds nitrogen-enriched air into the internal space (S), which is the target space (S), of the container (11). In the present embodiment, the gas supply device (30) is configured by a VPSA (Vacuum Pressure Swing Adsorption). Further, the gas supply device (30) is disposed at a lower left corner of the external storage space (S1), as shown in FIG. 1.

As shown in FIG. 4, the gas supply device (30) includes an air circuit (3) connecting together an air pump (31), first and second directional control valves (32) and (33), and first and second adsorption columns (34) and (35) each provided with an adsorbent for adsorbing a nitrogen component in the air, and a unit case (36) housing these components of the air circuit (3). In this manner, the gas supply device (30) forms a single unit with these components housed in the unit case (36), and is configured to be retrofitted to the container refrigeration apparatus (10).

(Air Pump)

The air pump (31) is provided in the middle of a gas passage (40) including an outside air passage (41), a discharge passage (42), a suction passage (43), and a supply passage (44). The filter unit (75), which will be described later, is provided at an inlet of the gas passage (40).

The air pump (31) is provided in the unit case (36), and includes a first pump mechanism (a pressurizing portion) (31a) and a second pump mechanism (a depressurizing portion) (31b), each of which sucks and compresses the air and discharges compressed air. The first and second pump mechanisms (31a) and (31b) are connected to a driving shaft of a motor (31c), and are driven in rotation by the motor (31c) to suck and compress the air, and discharge the compressed air.

One end of the outside air passage (41) which is arranged to pass through the unit case (36) from the interior to exterior of the unit case (36) is connected to the inlet of the first pump mechanism (31a). The filter unit (75) having an air filter is provided at the other end of the outside air passage (41). The outside air passage (41) is made of a flexible tube. Although not shown in the drawings, the other end of the outside air passage (41) where the filter unit (75) is provided is arranged in the second space (S12) of the external storage space (S1) above the condenser (22). Due to this configuration, the first pump mechanism (31a) sucks and compresses the outside air from which moisture has been removed while the outside air flows from the outside to inside of the unit case (36) through the filter unit (75) provided at the other end of the outside air passage (41). On the other hand, an outlet of the first pump mechanism (31a) is connected to one end of a discharge passage (42). The other end (downstream end) of the discharge passage (42) is divided into two branches, which are connected to the first the second directional control valves (32) and (33), respectively.

An inlet of the second pump mechanism (31b) is connected to one end of a suction passage (43). The other end (upstream end) of the suction passage (43) is divided into two branches, which are connected to the first and second directional control valves (32) and (33), respectively. An outlet of the second pump mechanism (31b) is connected to one end of the supply passage (44). The other end of the supply passage (44) opens in the secondary space (S22) on the blowout side of the internal fans (26) in the internal storage space (S2) of the container (11). The supply passage (44) is provided with a check valve (65) at the other end portion thereof. The check valve (65) allows the air to flow only from one end to the other end of the supply passage (44) and prevents backflow of the air.

In this embodiment, the discharge passage (42) and the suction passage (43) are connected via a bypass passage (47). The bypass passage (47) is provided with a bypass on-off valve (48), an opening/closing operation of which is controlled by the controller (55).

The first and second pump mechanisms (31a) and (31b) of the air pump (31) are configured as oil-free pumps without lubricant oil. Two blower fans (49) are disposed on the side of the air pump (31) to cool the air pump (31) by blowing air toward the air pump (31).

(Gas Mixture Generator (38))

In the present embodiment, a gas mixture generator (38) is comprised of the following directional control valves (32, 33) and adsorption columns (34, 35).

(Directional Control Valve)

The first and second directional control valves (32) and (33) are provided in the air circuit (3) between the air pump (31) and the first and second adsorption columns (34) and (35), and switches the connection between the air pump (31) and the first and second adsorption columns (34) and (35) among three connection states (first to third connection states) which will be described later. The controller (55) controls the switching.

Specifically, the first directional control valve (32) is connected to the discharge passage (42) connected to the outlet of the first pump mechanism (31a), the suction passage (43) connected to the inlet of the second pump mechanism (31b), and one end portion of the first adsorption column (34) (functioning as an inlet during pressurization). The first directional control valve (32) switches between a first state where the first adsorption column (34) is allowed to communicate with the outlet of the first pump mechanism (31a) to be blocked from the inlet of the second pump mechanism (31b) (the state shown in FIG. 4), and a second state where the first adsorption column (34) is allowed to communicate with the inlet of the second pump mechanism (31b) to be blocked from the outlet of the first pump mechanism (31a) (the state shown in FIG. 5).

The second directional control valve (33) is connected to the discharge passage (42) connected to the outlet of the first pump mechanism (31a), the suction passage (43) connected to the inlet of the second pump mechanism (31b), and one end portion of the second adsorption column (35). The second directional control valve (33) switches between a first state where the second adsorption column (35) is allowed to communicate with the inlet of the second pump mechanism (31b) to be blocked from the outlet of the first pump mechanism (31a) (the state shown in FIG. 4), and a second state where the second adsorption column (35) is allowed to communicate with the outlet of the first pump mechanism (31a) to be blocked from the inlet of the second pump mechanism (31b) (the state shown in FIG. 5).

If the first and second directional control valves (32) and (33) are set to be the first state, the air circuit (3) is switched to a first connection state where the outlet of the first pump mechanism (31a) is connected to the first adsorption column (34), and the inlet of the second pump mechanism (31b) is connected to the second adsorption column (35) (see FIG. 4). In this state, an adsorption operation is performed on the first adsorption column (34) to adsorb a nitrogen component in the outside air onto the adsorbent, and a desorption operation is performed on the second adsorption column (35) to desorb the nitrogen component adsorbed onto the adsorbent.

Figure 5:
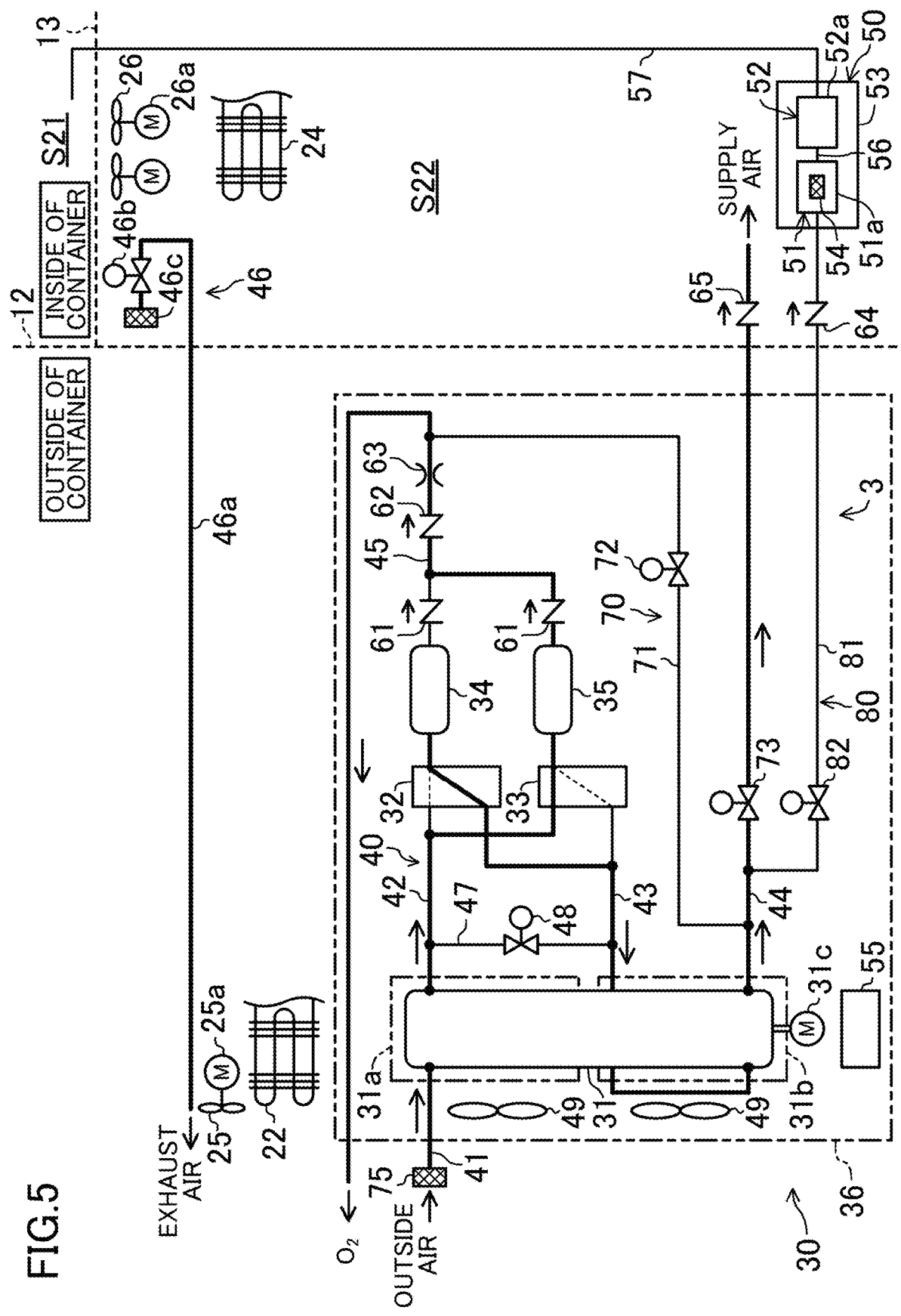
FIG. 5 is a piping system diagram illustrating a configuration of the CA system of the container refrigeration apparatus, together with the flow of air during a second operation.

If the first and second directional control valves (32) and (33) are set to be the second state, the air circuit (3) is switched to a second connection state where the outlet of the first pump mechanism (31a) is connected to the second adsorption column (35), and the inlet of the second pump mechanism (31b) is connected to the first adsorption column (34) (see FIG. 5). In this state, the adsorption operation is performed on the second adsorption column (35), and the desorption operation is performed on the first adsorption column (34).

If the first directional control valve (32) is set to be the first state, and the second directional control valve (33) is set to be the second state, the air circuit (3) is switched to a third connection state where the outlet of the first pump mechanism (31a) is connected to the first adsorption column (34), and the outlet of the first pump mechanism (31a) is connected to the second adsorption column (35) (not shown). In this state, both of the first and second adsorption columns (34) and (35) are connected to the outlet of the first pump mechanism (31a), and compressed outside air is supplied from the first pump mechanism (31a) to both of the first and second adsorption columns (34) and (35). In this state, the adsorption operation is performed on both of the first and second adsorption columns (34) and (35).

(Adsorption Column)

The first and second adsorption columns (34) and (35) are configured as cylindrical members filled with an adsorbent. The adsorbent that fills the first and second adsorption columns (34) and (35) adsorbs a nitrogen component in a state where the adsorption columns (34, 35) are pressurized, and desorbs the nitrogen component in a state where these adsorption columns (34, 35) are depressurized.

The adsorbent that fills the first and second adsorption columns (34) and (35) may be comprised of porous zeolite having pores with a diameter smaller than the diameter of nitrogen molecules (3.0 angstrom) and larger than the diameter of oxygen molecules (2.8 angstrom), for example. The nitrogen component in the air may be adsorbed using zeolite having pores of such a diameter as the adsorbent.

Cations exist in the pores of zeolite, and thus an electric field has been generated to cause polarity. Therefore, zeolite has the property of adsorbing polarity molecules such as water molecules. As a result, the adsorbent made of zeolite and filling the first and second adsorption columns (34) and (35) adsorbs not only nitrogen but also moisture (vapor) in the air. The moisture adsorbed onto the adsorbent is desorbed from the adsorbent together with the nitrogen component as a result of the desorption operation. Consequently, nitrogen-enriched air including moisture is supplied into the internal space (S) of the container (11), thus increasing the humidity in the internal space (S). Furthermore, the adsorbent is regenerated, which may extend the adsorbent's life.

In this configuration, if the air pump (31) supplies the compressed outside air to the first and second adsorption columns (34) and (35) to pressurize these columns (34) and (35), the nitrogen component in the outside air is adsorbed onto the adsorbent. This produces oxygen-enriched air that has had its nitrogen concentration lowered and oxygen concentration increased by including less nitrogen component than the outside air does. On the other hand, if the air pump (31) sucks the air from the first and second adsorption columns (34) and (35) to depressurize these columns (34) and (35), the nitrogen component adsorbed onto the adsorbent is desorbed. This produces nitrogen-enriched air that has had its nitrogen concentration increased and oxygen concentration lowered by including more nitrogen component than the outside air does. In this embodiment, the nitrogen-enriched air of 92% nitrogen and 8% oxygen, for example, is produced.

The respective other ends of the first and second adsorption columns (34) and (35) (functioning as outlets during pressurization) are connected to one end of an oxygen discharge passage (45) through which the oxygen-enriched air that has been produced in the first and second adsorption columns (34) and (35) from the compressed outside air supplied by the first pump mechanism (31a) is guided toward the outside of the container (11). The one end of the oxygen discharge passage (45) is divided into two branches, which are connected to the other ends of the first and second adsorption columns (34) and (35), respectively. The other end of the oxygen discharge passage (45) opens outside the gas supply device (30), i.e., outside the container (11). The branches of the oxygen discharge passage (45) are connected to the other ends of the first and second adsorption columns (34) and (35), respectively. Each of the junction portions is provided with a check valve (61) which prevents backflow of the air from the oxygen discharge passage (45) toward the first and second adsorption columns (34) and (35).

A check valve (62) and an orifice (63) are arranged at some midpoints of the oxygen discharge passage (45) so as to be sequentially arranged from one end to the other end of the oxygen discharge passage (45). The check valve (62) prevents backflow of the nitrogen-enriched air from an exhaust connection passage (71), which will be described later, toward the first and second adsorption columns (34) and (35). The orifice (63) depressurizes the oxygen-enriched air which has flowed out of the first and second adsorption columns (34) and (35) before the oxygen-enriched air is discharged to the outside of the container.

(Supply-Discharge Switching Mechanism)

The air circuit (3) is provided with a supply-discharge switching mechanism (70) that switches between a gas supply operation, which will be described later (see FIGS. 4 and 5), of supplying the produced nitrogen-enriched air into the internal space (S) of the container (11), and a gas discharge operation (not shown) of discharging the produced nitrogen-enriched air to the outside of the container. The supply-discharge switching mechanism (70) includes an exhaust connection passage (71), an exhaust on-off valve (72), and a supply on-off valve (73).

The exhaust connection passage (71) has one end connected to the supply passage (44), and the other end connected to the oxygen discharge passage (45). The other end of the exhaust connection passage (71) is connected to the oxygen discharge passage (45) so as to be located further toward the outside of the container than the orifice (63).

The exhaust on-off valve (72) is provided at the exhaust connection passage (71). The exhaust on-off valve (72) is provided at a midpoint of the exhaust connection passage (71), and is comprised of a solenoid valve which is switched between an open state where the flow of the nitrogen-enriched air from the supply passage (44) is allowed, and a closed state where the flow of the nitrogen-enriched air is blocked. The controller (55) controls an opening/closing operation of the exhaust on-off valve (72).

The supply on-off valve (73) is provided at the supply passage (44) so as to be located further toward the other end (toward the inside of the container) than the junction where the exhaust connection passage (71) is connected to the supply passage (44). The supply on-off valve (73), which is located further toward the inside of the container than the junction between the supply passage (44) and the exhaust connection passage (71), is comprised of a solenoid valve which is switched between an open state where the flow of the nitrogen-enriched air toward the inside of the container is allowed, and a closed state where the flow of the nitrogen-enriched air toward the inside of the container is blocked. The controller (55) controls an opening/closing operation of the supply on-off valve (73).

(Measurement Unit)

The air circuit (3) is provided with a measurement unit (80) for performing a supply air measurement operation (not shown) to measure the concentration of the produced nitrogen-enriched air using an oxygen sensor (51) of the sensor unit (50), which will be described later, provided in the internal space (S) of the container (11). The measurement unit (80) includes a branch pipe (a measurement passage) (81) and a measurement on-off valve (82), and allows part of the nitrogen-enriched air flowing through the supply passage (44) to be diverged toward the oxygen sensor (51).

Specifically, the branch pipe (81) has one end connected to the supply passage (44), and the other end coupled to an oxygen sensor box (51a), which will be described later, of the oxygen sensor (51). In this embodiment, the branch pipe (81) is branched from the supply passage (44) in the unit case (36) and extends from the interior to exterior of the unit case (36).

The measurement on-off valve (82) is provided for the branch pipe (81) in the unit case. The measurement on-off valve (82) is comprised of a solenoid valve which switches between an open state where the flow of the nitrogen-enriched air in the branch pipe (81) is allowed, and a closed state where the flow of the nitrogen-enriched air in the branch pipe (81) is blocked. The controller (55) controls an opening/closing operation of the measurement on-off valve (82). As will be described in detail later, the measurement on-off valve (82) is open only when a supply air measurement operation to be described later is performed, and is closed in the other modes.

[Exhaust Portion]

—Configuration of Exhaust Portion—

As shown in FIG. 2, the exhaust portion (46) includes an exhaust passage (46a) connecting the internal storage space (S2) and the external space of the container together, an exhaust valve (46b) connected to the exhaust passage (46a), and a membrane filter (46c) provided at an inlet end (an end located inside the container) of the exhaust passage (46a). The exhaust passage (46a) passes through the casing (12) from the interior to exterior of the casing (12). The exhaust valve (46b) is provided adjacent to an internal end of the exhaust passage (46a), and is comprised of a solenoid valve which is switched between an open state where the flow of the air in the exhaust passage (46a) is allowed, and a closed state where the flow of the air in the exhaust passage (46a) is blocked. The controller (55) controls an opening/closing operation of the exhaust valve (46b).

—Operation of Exhaust Portion—

When the internal fans (26) are rotating, an exhaust operation is performed. That is, the controller (55) opens the exhaust valve (46b) to discharge the air (inside air) in the internal storage space (S2) communicating with the internal space (S) to the outside of the container.

Specifically, when the internal fans (26) are rotating, the pressure of the secondary space (S22) on the blowout side becomes higher than the pressure of the external space of the container (i.e., the atmospheric pressure). Thus, when the exhaust valve (46b) is open, due to the pressure difference between the ends of the exhaust passage (46a) (the pressure difference between the external space of the container and the secondary space (S22)), the air in the internal storage space (S2) communicating with the internal space (S) (inside air) is discharged to the outside of the container via the exhaust passage (46a).

[Sensor Unit]

—Configuration of Sensor Unit—

As shown in FIG. 2, the sensor unit (50) is provided in the secondary space (S22) on the blowout side of the internal fans (26) in the internal storage space (S2). The sensor unit (50) includes an oxygen sensor (51), a carbon dioxide sensor (52), a fixing member (53), a membrane filter (54), a connection pipe (56), and an exhaust pipe (57).

The oxygen sensor (51) has an oxygen sensor box (51a) housing a galvanic-cell sensor therein. The oxygen sensor (51) measures the value of a current flowing through an electrolytic solution of the galvanic-cell sensor to measure the oxygen concentration of a gas in the oxygen sensor box (51a). An outer surface of the oxygen sensor box (51a) is fixed to the fixing member (53). Another outer surface of the oxygen sensor box (51a) opposite from the outer surface fixed to the fixing member (53) has an opening, to which the membrane filter (54), which is air-permeable and waterproof, is attached. In addition, one end of the connection pipe (56) is coupled via a connector to one of the side surfaces of the oxygen sensor box (51a). Further, the branch pipe (81) of the measurement unit (80) is coupled via a connector (pipe joint) to a lower surface of the oxygen sensor box (51a).

The carbon dioxide sensor (52) has a carbon dioxide sensor box (52a). The carbon dioxide sensor (52) is a non-dispersive infrared (NDIR) sensor which radiates infrared rays to the gas in the carbon dioxide sensor box (52a) to measure an absorption amount of infrared rays having a wavelength specific to carbon dioxide, thereby measuring the carbon dioxide concentration in the gas. The other end of the connection pipe (56) is coupled via a connector to one side surface of the carbon dioxide sensor box (52a). Furthermore, one end of the exhaust pipe (57) is coupled via a connector to the other side surface of the carbon dioxide sensor box (52a).

The fixing member (53) is fixed to the casing (12) with the oxygen sensor (51) and the carbon dioxide sensor (52) attached thereto.

The connection pipe (56) is, as described above, coupled to the one side surface of the oxygen sensor box (51a) and the one side surface of the carbon dioxide sensor box (52a), and allows the internal space of the oxygen sensor box (51a) to communicate with the internal space of the carbon dioxide sensor box (52a).

As described above, the exhaust pipe (57) has one end coupled to the other side surface of the carbon dioxide sensor box (52a), and the other end open near the suction port of the internal fans (26). That is, the exhaust pipe (57) allows the internal space of the carbon dioxide sensor box (52a) to communicate with the primary space (S21) of the internal storage space (S2).

—Concentration Measurement Operation—

The secondary and primary spaces (S22) and (S21) of the internal storage space (S2) communicate with each other via an air passage (58) formed by the membrane filter (54), the internal space of the oxygen sensor box (51a), the connection pipe (56), the internal space of the carbon dioxide sensor box (52a), and the exhaust pipe (57). Thus, when the internal fans (26) are rotating, the pressure of the primary space (S21) becomes lower than the pressure of the secondary space (S22). Due to this pressure difference, the air in the container flows from the secondary space (S22) to the primary space (S21) in the air passage (58) to which the oxygen sensor (51) and the carbon dioxide sensor (52) are connected. Thus, the inside air sequentially flows through the oxygen sensor (51) and the carbon dioxide sensor (52), and then the oxygen concentration of the air is measured by the oxygen sensor (51), and the carbon dioxide concentration of the air is measured by the carbon dioxide sensor (52).

[Controller]

The controller (55) is configured to perform a concentration control operation for controlling the oxygen concentration and carbon dioxide concentration of the air in the container (11) to desired concentrations, respectively. Specifically, the controller (55) controls the operation of the gas supply device (30) and the exhaust portion (46) based on measurement results obtained by the oxygen sensor (51) and the carbon dioxide sensor (52) so that the oxygen concentration and carbon dioxide concentration of the air in the container (11) are controlled to desired target concentrations (e.g., 3% oxygen and 5% carbon dioxide).

[Filter Unit]

Figure 6:
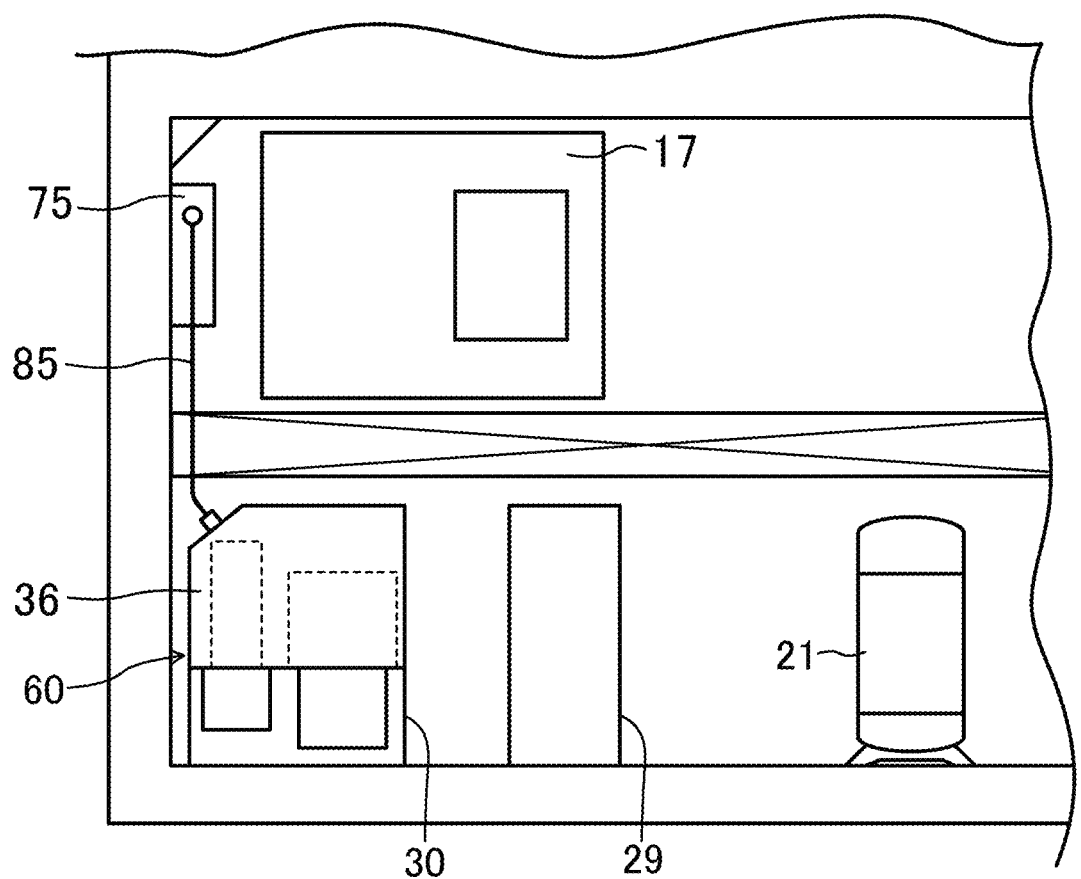
FIG. 6 is an enlarged perspective view illustrating a major part of the container refrigeration apparatus.

As shown in FIGS. 1 and 6, the gas supply device (30) is disposed at the lower left corner of the external storage space (51) (at the lower left end of the condenser (22)), and the filter unit (75) for taking air into the gas supply device (30) is disposed at the left of the electric component box (17) when the external storage space (51) is viewed from the front. Specifically, the filter unit (75) is arranged on a left inner surface of the external storage space (51) of the casing (11). The air pump (31) in the unit case (36) is connected to one end of an air tube (85) constituting the outside air passage (41) for sucking the air. The filter unit (75) is connected to the other end of the air tube (85).

Figure 7:
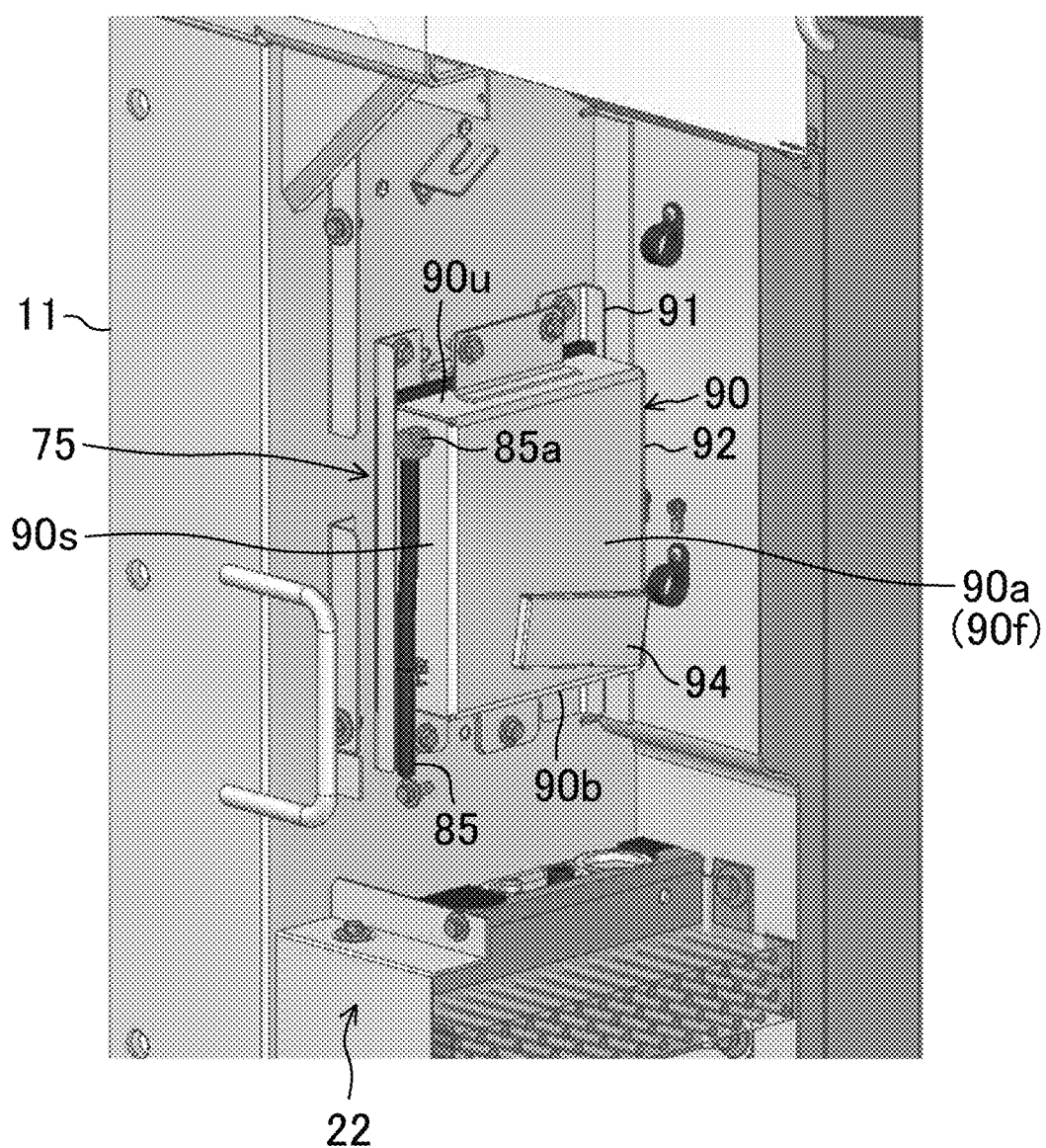
FIG. 7 is a perspective view illustrating the container refrigeration apparatus with a filter unit attached to a casing.
Figure 8:
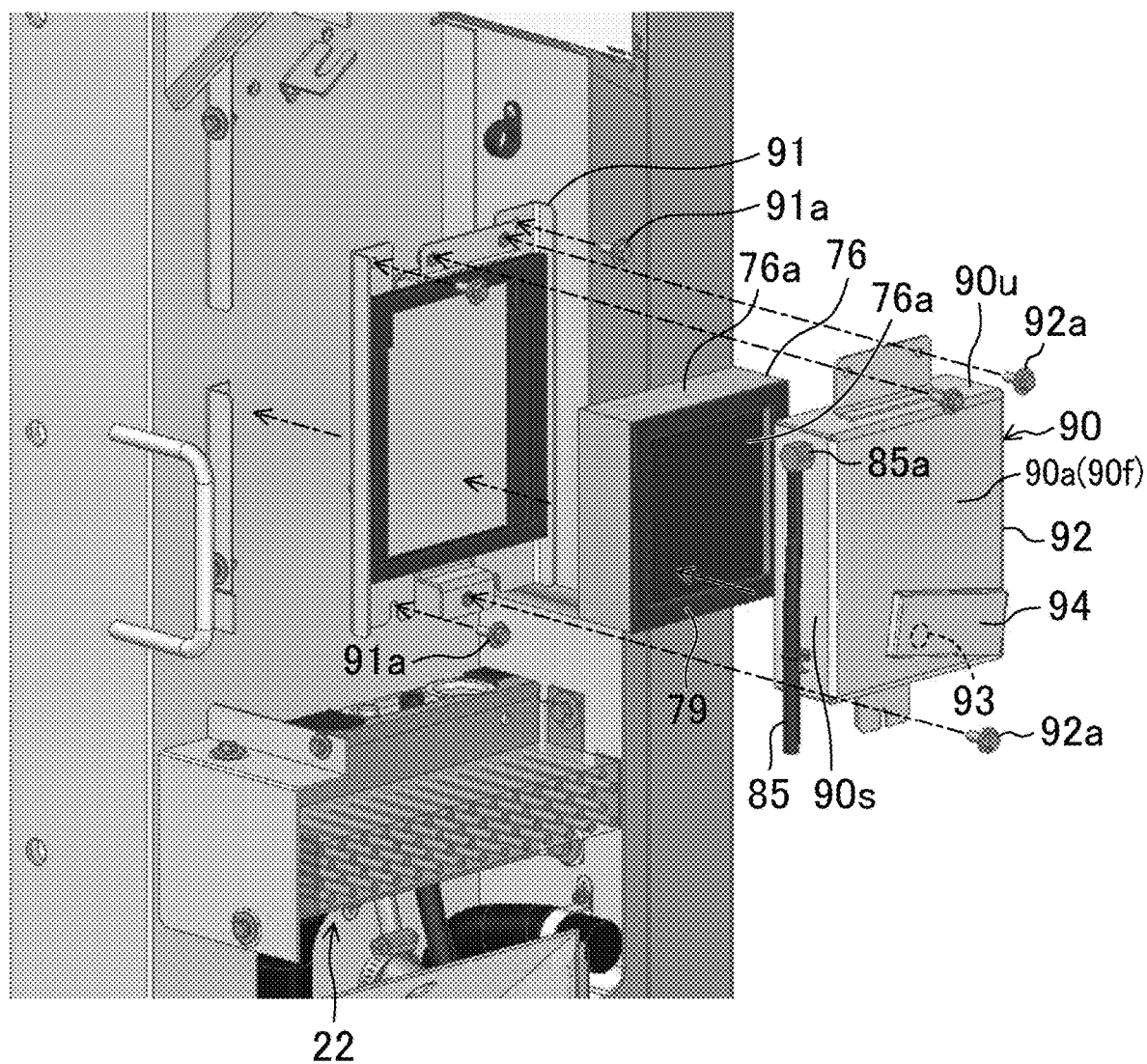
FIG. 8 is an exploded perspective view of FIG. 7.
Figure 9:
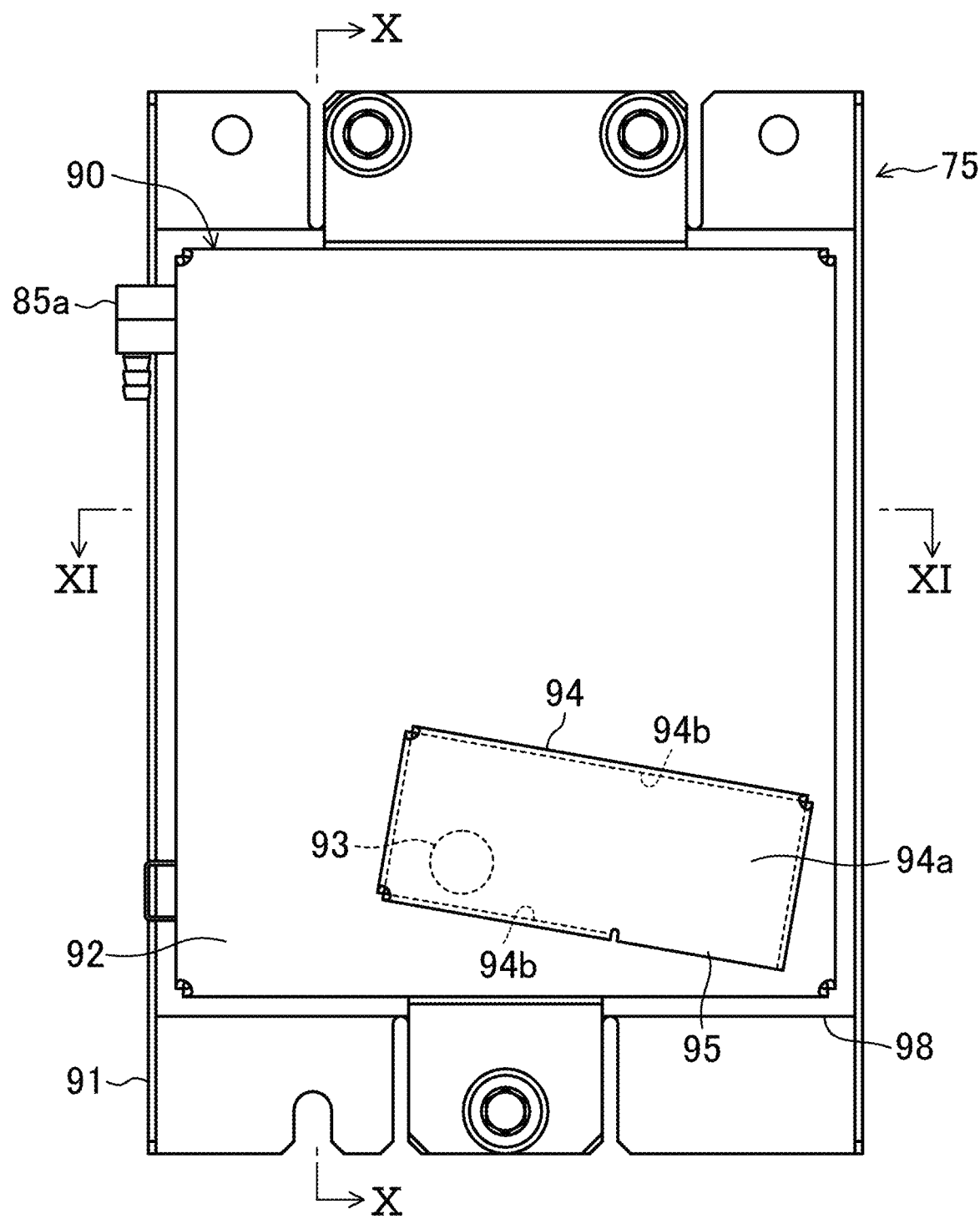
FIG. 9 is a front view of a filter unit.
Figure 10:
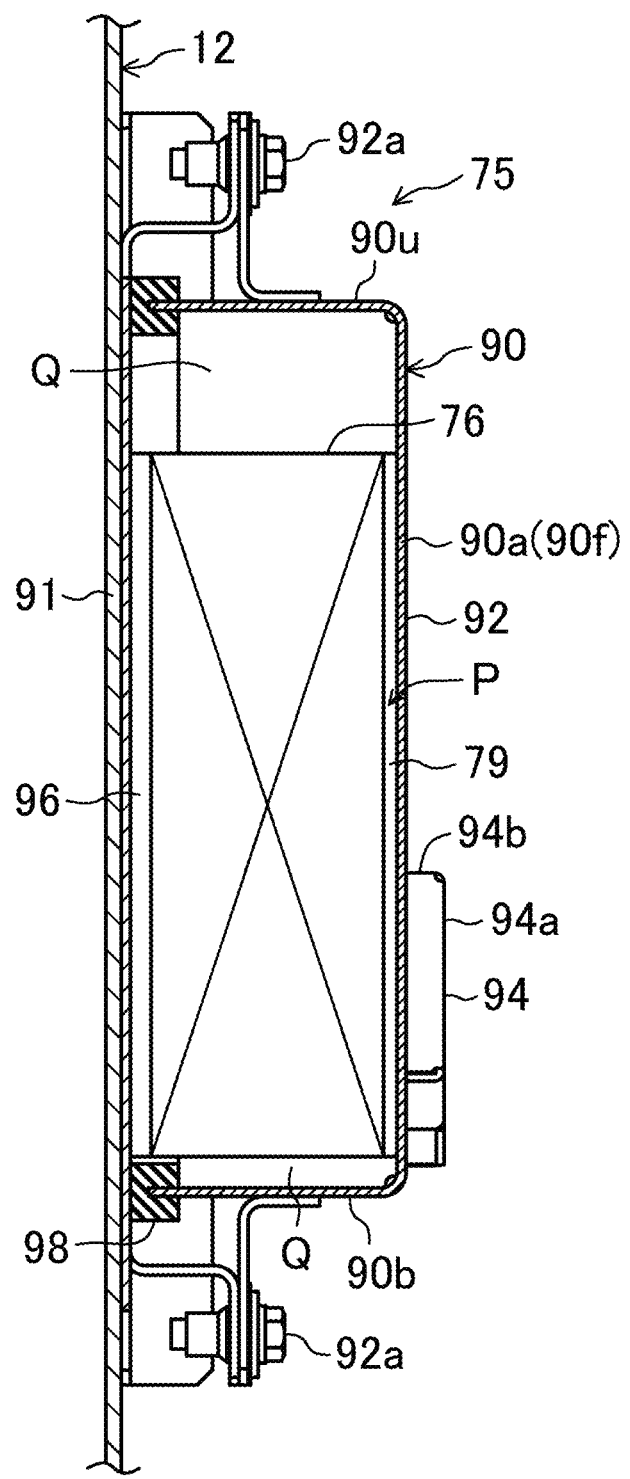
FIG. 10 is a cross-sectional view taken along line X-X shown in FIG. 9.
Figure 11:
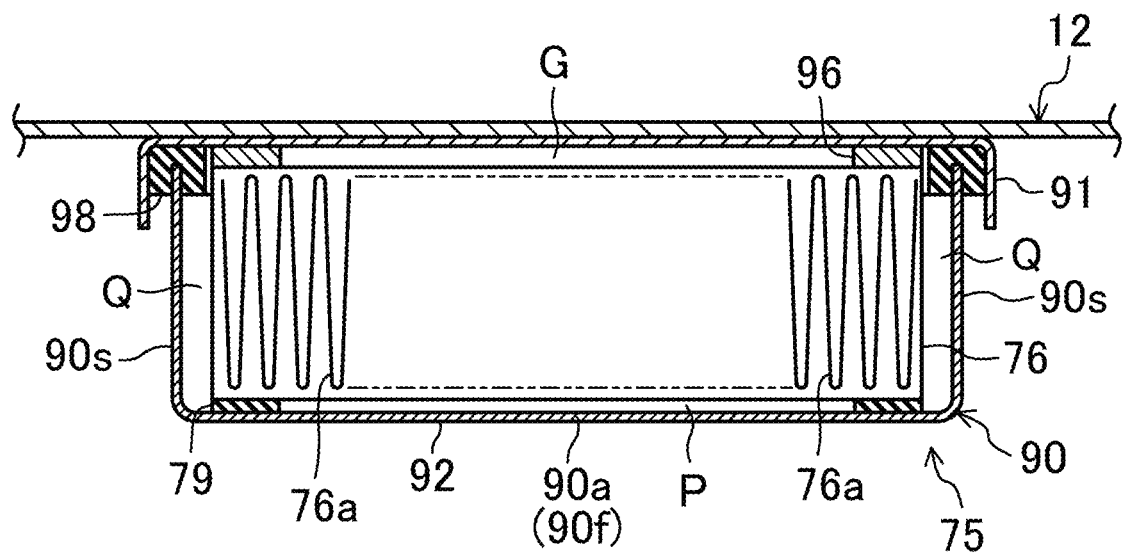
FIG. 11 is a cross-sectional view taken along line XI-XI shown in FIG. 9.
Figure 12:
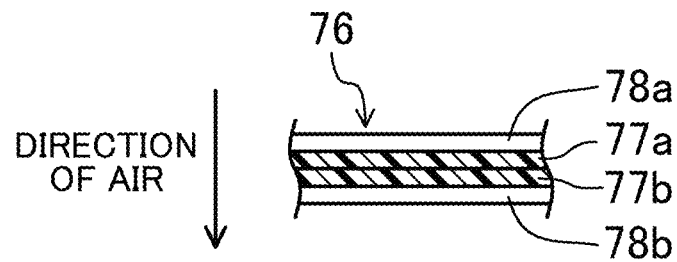
FIG. 12 is a view illustrating a cross-sectional structure of an air filter.

FIG. 7 is a perspective view of the filter unit (75) attached to the casing (12) of the container refrigeration apparatus (10). FIG. 8 is an exploded perspective view of the filter unit (75) of FIG. 7. FIG. 9 is a front view of the filter unit (75). FIG. 10 is a cross-sectional view taken along line X-X in FIG. 9, FIG. 11 is a cross-sectional view taken along line XI-XI in FIG. 9, and FIG. 12 is a view illustrating a cross-sectional structure of an air filter.

The filter unit (75) is provided with a filter box (90) and an air filter (76) housed in the filter box (90). The air filter (76) is in the shape of a rectangular parallelepiped, and the filter box (90) is a hollow member substantially in the shape of a hexahedron. One surface (76a) of the six surfaces of the air filter (76) serves as an air inflow surface, and the other surfaces air outflow surfaces. The air filter (76) is arranged such that all surfaces are spaced apart from the corresponding wall surfaces of the filter box (90). In addition, one of the surfaces of the filter box (90) corresponding to the air inflow surface of the air filter (76) constitutes an air intake surface (90a), in which an air intake port (93) is formed.

The filter box (90) includes a front wall (90f) forming the air intake surface (90a), sidewalls (90s) positioned on the left and right sides of the air filter (76), an upper wall (90u) positioned above the air filter (76), and a bottom wall (90b) positioned below the air filter (76).

A space between the air filter (76) and the filter box (90) includes two types of spaces, namely, a primary space (P) which is present between the air intake surface (90a) provided with the air intake port (93a) and the air inflow surface of the air filter (76) and through which the air flows toward the air filter (76), and a plurality of secondary spaces (Q), each of which is present between one of the other surfaces of the air filter (76) and an associated one of the wall surfaces of the filter box (90) and into which the air flows from the air filter (76). A seal packing (79) which closely adheres to the air filter (76) and the filter box (90) is provided at the peripheral edge of a front surface of the air filter (76) to separate the primary space (P) from the secondary spaces (Q).

In one of the surfaces of the filter box (90) forming the secondary spaces (Q), a tube joint (85a) to which the other end of the air tube (85) is connected is provided as an air outflow port. Specifically, the tube joint (85a) is provided for the left side surface of the filter box (90) in FIG. 9.

The filter box (90) includes a base member (91) fixed to the casing (12) of the container refrigeration apparatus (10) with screws (91a), and a box body (92) that houses the air filter (76) therein and is fixed to the base member (91) with screws (92a). A packing (98) is provided between the base member (91) and the box body (92) to keep the internal space of the filter box (90) airtight.

The air intake port (93) of the filter box (90) is formed near the lower end of the air intake surface (90a) of the filter box (90). The air intake surface (90a) of the filter box (90) is provided with an intake port cover (94) covering the air intake port (93). The intake port cover (94) includes a front cover plate (94a) opposed to the air intake surface (90a), and a peripheral cover plate (94b) formed on a peripheral edge of the front cover plate (94a). The peripheral cover plate (94b) is partially cut out to form a ventilation hole (95) in the peripheral cover plate (94b) below the air intake port (93).

Specifically, the front cover plate (94a) of the intake port cover (94) is rectangular, and has a lower side inclined with respect to a horizontal line. The ventilation hole (95) is formed in a predetermined range of a portion of the peripheral cover plate (94b) formed along the lower side of the front cover plate (94a), the predetermined range being near a lower end of the peripheral cover plate (94b).

The filter box (90) includes the base member (91) as a back wall facing the back surface of the air filter (76). A spacer (96) forming a communication passage (G) is provided between the back surface of the air filter (76) and the base member (91) serving as the back wall of the filter box (90).

As shown in FIG. 11, the air filter (76) is a pleated filter having a plurality of pleats (76a). The air filter (76) includes filter substrates (77a, 77b), each of which is made of a membrane filter having waterproofness and air permeability, and fibrous coating layers (78a, 78b) respectively covering the surfaces of the filter substrates (77a, 77b). The membrane filter is made of polytetrafluoroethylene (PTFE). Nonwoven fabric is used as the coating layers (78a, 78b). The air filter (76) is disposed such that the pleats (76a) extend in the vertical direction.

The air filter (76) includes a stack of a plurality of (two in this embodiment) filter substrates (77a, 77b), and the coating layers (78a, 78b) are respectively formed on the filter substrates (77a, 77b). The front and back surfaces of the stack of the filter substrates (77a, 77b) are respectively covered with the coating layers (78a, 78b). The filter substrate (77a) may include only a single layer, and in this case, the coating layer (78a) made of nonwoven fabric is provided on the surface of the layer from which the air is sucked.

—Operation—
<Operation of Refrigerant Circuit>

In this embodiment, a unit controller (100) shown in FIG. 3 performs a cooling operation for cooling the air in the container (11).

During the cooling operation, the unit controller (100) controls the operation of the compressor (21), the expansion valve (23), the external fan (25), and the internal fans (26) such that the temperature of the air in the container reaches a desired target temperature based on measurement results provided by a temperature sensor (not shown). In this case, the refrigerant circuit (20) allows the refrigerant to circulate to perform a vapor compression refrigeration cycle. Then, the air in the container (11) guided to the internal storage space (S2) by the internal fans (26) is cooled when passing through the evaporator (24) by the refrigerant flowing through the evaporator (24). The air in the container cooled by the evaporator (24) passes through the underfloor path (19a), and is blown again into the internal space (S) of the container (11) via the blowout port (18b). Thus, the air in the container (11) is cooled.

<Basic Operation of Gas Supply Device>

The gas supply device (30) alternately repeats a first operation (see FIG. 4) in which the first adsorption column (34) is pressurized and the second adsorption column (35) is depressurized simultaneously, and a second operation (see FIG. 5) in which the first adsorption column (34) is depressurized and the second adsorption column (35) is pressurized simultaneously, each for predetermined periods of time (e.g., 14.5 seconds) so as to produce the nitrogen-enriched air and the oxygen-enriched air. In this embodiment, a pressure equalization operation (not shown) in which the first and second adsorption columns (34) and (35) are both pressurized for a predetermined time (e.g., 1.5 seconds) during the intervals between the first and second operations. The controller (55) controls the first and second directional control valves (32) and (33) to perform the switching among these operations.

«First Operation»

During the first operation, the controller (55) switches the first and second directional control valves (32) and (33) to the first state shown in FIG. 4. Thus, the air circuit (3) is set to the first connection state in which the first adsorption column (34) communicates with the outlet of the first pump mechanism (31a) and is blocked from the inlet of the second pump mechanism (31b), and simultaneously, the second adsorption column (35) communicates with the inlet of the second pump mechanism (31b) and is blocked from the outlet of the first pump mechanism (31a).

The first pump mechanism (31a) supplies the compressed outside air to the first adsorption column (34). A nitrogen component contained in the air that has flowed into the first adsorption column (34) is adsorbed on the adsorbent of the first adsorption column (34). Thus, during the first operation, the first pump mechanism (31a) supplies the compressed outside air to the first adsorption column (34), in which the adsorbent adsorbs the nitrogen component in the outside air. As a result, oxygen-enriched air having a lower nitrogen concentration and a higher oxygen concentration than the outside air is produced. The oxygen-enriched air flows from the first adsorption column (34) to the oxygen discharge passage (45).

On the other hand, the second pump mechanism (31b) sucks the air from the second adsorption column (35). Simultaneously, the second pump mechanism (31b) also sucks the nitrogen component that has been adsorbed onto the adsorbent in the second adsorption column (35) together with the air, thereby allowing the adsorbent to desorb the nitrogen component. Thus, during the first operation, the second pump mechanism (31b) sucks the air out of the second adsorption column (35) to allow the adsorbent to desorb the nitrogen component adsorbed thereon. This produces nitrogen-enriched air containing the nitrogen component desorbed from the adsorbent, and having a higher nitrogen concentration and a lower oxygen concentration than the outside air. The nitrogen-enriched air is sucked into the second pump mechanism (31b), compressed, and discharged toward the supply passage (44).

«Second Operation»

During the second operation, the controller (55) switches the first and second directional control valves (32) and (33) to the second state shown in FIG. 5. Thus, the air circuit (3) is set to the second connection state where the first adsorption column (34) communicates with the inlet of the second pump mechanism (31b) and is blocked from the outlet of the first pump mechanism (31a), and simultaneously, the second adsorption column (35) communicates with the outlet of the first pump mechanism (31a) and is blocked from the inlet of the second pump mechanism (31b).

The first pump mechanism (31a) supplies the compressed outside air to the second adsorption column (35). A nitrogen component contained in the air which has flowed into the second adsorption column (35) is adsorbed on the adsorbent of the second adsorption column (35). Thus, during the second operation, the first pump mechanism (31a) supplies the compressed outside air to the second adsorption column (35), in which the adsorbent adsorbs the nitrogen component in the outside air, thereby producing oxygen-enriched air having a lower nitrogen concentration and a higher oxygen concentration than the outside air. The oxygen-enriched air flows from the second adsorption column (35) to the oxygen exhaust passage (45).

On the other hand, the second pump mechanism (31b) sucks the air from the first adsorption column (34). Simultaneously, the second pump mechanism (31b) also sucks the nitrogen component that has been adsorbed onto the adsorbent in the first adsorption column (34) together with the air, thereby allowing the adsorbent to desorb the nitrogen component. Thus, during the second operation, the second pump mechanism (31b) sucks the air out of the first adsorption column (34) to allow the adsorbent to desorb a nitrogen component adsorbed thereon. This produces nitrogen-enriched air containing the nitrogen component desorbed from the adsorbent, and having a higher nitrogen concentration and a lower oxygen concentration than the outside air. The nitrogen-enriched air is sucked into the second pump mechanism (31b), compressed, and discharged toward the supply passage (44).

As mentioned above, in the first operation, the first adsorption column (34) is pressurized by the first pump mechanism (31a) to perform the adsorption operation, whereas the second adsorption column (35) is depressurized by the second pump mechanism (31b) to perform the desorption operation. During the second operation, the second adsorption column (35) is pressurized by the first pump mechanism (31a) to perform the adsorption operation, whereas the first adsorption column (34) is depressurized by the second pump mechanism (31b) to perform the desorption operation. Thus, when the first operation is switched to the second operation or the second operation is switched to the first operation without the pressure equalization operation performed between the first and second operations, the pressure in the adsorption column where the desorption operation has been performed before the switching is remarkably low right after the switching. Thus, it takes time until the pressure in this adsorption column increases, and the adsorption operation does not start soon.

Thus, in this embodiment, the air circuit (3) is switched to the third connection state when the first operation is switched to the second operation and when the second operation is switched to the first operation, so that the first and second adsorption columns (34) and (35) communicate with each other via the first and second directional control valves (32) and (33). In this configuration, the internal pressures of the first and second adsorption columns (34) and (35) are immediately equalized (i.e., become intermediate pressures between the respective inner pressures). The pressure equalization operation immediately increases the pressure in the adsorption column which has been depressurized by the second pump mechanism (31b) and performing the desorption operation before the switching. Thus, the adsorption operation is performed immediately after the connection with the first pump mechanism (31a).

In this manner, the gas supply device (30) alternately repeats the first and second operations, with the pressure equalization operation performed between the first and second operations, thereby producing the nitrogen-enriched air and the oxygen-enriched air in the air circuit (3).

Advantages of Embodiment

According to the present embodiment, the air flows from the primary space (P) into the air filter (76) shaped in a rectangular parallelepiped through the air intake port (93) formed in the air intake surface (90a) of the filter box (90), and flows out from the air filter (76) into the secondary spaces (Q). In this embodiment, suppose one of the surfaces of the air filter (76) facing the primary space (P) is a front surface, the air flows out from the side surfaces, upper surface, lower surface, or back surface of the air filter (76). Thus, the air that has flowed out can flow in an arbitrary direction. Therefore, in this embodiment, the filter box (90) is configured to allow the air to flow into the filter box (90) through the front surface and flow out from the filter box (90) through the side surfaces, so that the air does not flow toward the back side of the filter box (90). This can make the filter box (90) thinner, and can reduce the increase in size of the filter unit (75), even if the air passage area of the air filter (76) is increased to increase the dust holding capacity.

Further, according to the present embodiment, the air flows from the ventilation hole (95) of the intake port cover (94) into the filter box (90) through the air intake port (93) formed in the lower portion of the filter box (90). In this embodiment, provision of the intake port cover (94) suppresses the flow of water into the filter box (90). Further, in this embodiment, water, if accumulated in the filter box (90), flows from the air intake port (93) opened in the lower portion of the filter box (90) and goes outside through the ventilation hole (95) formed in the inclined lower side of the intake port cover (94). Thus, water does not accumulate to the level above the air intake port (93). This can reduce the increase in pressure loss caused by water that adheres to the air filter (76). Moreover, this can also reduce the thickness of the filter box (90).

According to the present embodiment, the air flows into the filter box (90) through the front wall (90a) thereof, which is the air intake surface (90a), and then flows out from the air outflow port (85a) cut in the sidewall (90s), the upper wall (90u), or the front wall (90. Since the bottom wall (90b) has no air outflow port (85a), water, if accumulated in the filter box (90), does not flow into the air pump (31) and the target space (S). This can protect the air pump (31) and the contents of the target space (S) from damage caused by water.

According to the above-described embodiment, the filter box (90) can be thinned down by merely providing a spacer (96) between the back surface of the air filter (76) and the back wall (91) of the filter box (90).

Other Embodiments

The foregoing embodiment may be modified as follows.

For example, in the embodiment described above, the gas supply device (30) sucks the air from the filter unit (75), and feeds the nitrogen-enriched air into the internal space (S), which is the target space (S), of the container (11). However, the target space (S) is not necessarily the internal space (S) of the container (11), and the gas to be fed is not necessarily the nitrogen-enriched air. For example, the gas supply device may be a device for supplying outside air into a storehouse in a coastal area.

In the filter box (90) of the embodiment, the tube joint (85a), which is an air outflow port through which the air is taken out of the secondary spaces of the air filter (76), is not necessarily provided on the sidewall (90s) of the filter box (90), but may be provided on the upper wall (90u) or front wall (90f) of the filter box (90), for example.

The filter (76) is not limited to have a rectangular parallelepiped shape, and may have other shapes than the rectangular parallelepiped shape such as a polyhedral shape, or the filter box (90) may be in a different shape. All the surfaces of the filter (76) are not necessarily spaced apart from the corresponding wall surfaces of the filter box (90) as long as the primary space (P) and the secondary spaces (Q) are formed in the filter box (90) and the air flows from the primary space (P) to the secondary spaces (Q).

INDUSTRIAL APPLICABILITY

As can be seen in the foregoing, the present disclosure is useful for a filter unit, a gas supply device including the filter unit, an inside air control system that supplies a gas mixture having a small content of oxygen and a large content of nitrogen to a target space, and a container refrigeration apparatus including the inside air control system.

DESCRIPTION OF REFERENCE CHARACTERS

10 Container Refrigeration Apparatus
11 Container
12 Casing
20 Refrigerant Circuit
30 Gas Supply Device
31 Air Pump
38 Gas Mixture Generator
40 Gas Passage
60 Inside Air Control System
75 Filter Unit
76 Air Filter
76a Pleat
77a Filter Substrate
77b Filter Substrate
78a Coating Layer
78b Coating Layer
85a Tube Joint (Air Outflow Port)
90 Filter Box
90a Air Intake Surface
90f Front Wall
90s Sidewall
90u Upper Wall
90b Bottom Wall
91 Base Member (Back Wall)
93 Air Intake Port
94 Intake Port Cover
94a Front Cover Plate
94b Peripheral Cover Plate
95 Ventilation Hole
96 Spacer
G Communication Passage
P Primary Space
Q Secondary Space
S Internal Space (Target Space)

The invention claimed is:

1. A filter unit, comprising:
a filter box; and
an air filter housed in the filter box, wherein
the air filter is arranged to be spaced apart from wall surfaces of the filter box,
an air intake port is formed in an air intake surface, which is one of surfaces of the filter box,
a space which is present between the air intake surface provided with the air intake port and an air inflow surface of the air filter corresponding to the air intake surface is a primary space through which the air flows into the air filter, and a plurality of spaces, each of which is present between one of surfaces of the air filter other than the air inflow surface and an associated one of the wall surfaces of the filter box, are secondary spaces into each of which the air flows out from the air filter,
the air intake port is formed in a lower portion of the air intake surface of the filter box,
the air intake surface is provided with an intake port cover covering the air intake port,
the intake port cover includes a front cover plate opposed to the air intake surface, and a peripheral cover plate formed on a peripheral edge of the front cover plate, and
a ventilation hole is formed in the peripheral cover plate below the air intake port.

2. The filter unit of claim 1, wherein
the front cover plate of the intake port cover is rectangular, and has a lower side inclined with respect to a horizontal line, and
the ventilation hole is formed in a predetermined range of a portion of the peripheral cover plate formed along the lower side of the front cover plate, the predetermined range being in a lower portion of the peripheral cover plate.

3. The filter unit of claim 1, wherein
the filter box includes a front wall forming the air intake surface, sidewalls positioned on the left and right sides of the air filter, an upper wall positioned above the air filter, and a bottom wall positioned below the air filter, and
at least one of the sidewalls, the upper wall, and the front wall is provided with an air outflow port through which the air is taken out from the secondary spaces of the air filter.

4. The filter unit of claim 1, wherein
the filter box includes a back wall facing a back surface of the air filter, and
a spacer is provided to form a communication passage between the back surface of the air filter and the back wall of the filter box.

5. A gas supply device, comprising:
a gas passage that supplies air to a target space;
a filter unit provided at an inlet of the gas passage; and
an air pump provided in the middle of the gas passage, wherein
the filter unit is the filter unit of claim 1.

6. An inside air control system, comprising:
a gas supply device; and
a gas mixture generator that generates a gas mixture having a higher nitrogen concentration and a lower oxygen concentration than air sucked through a filter unit of the gas supply device, wherein
the gas supply device is the gas supply device of claim 5, and
gas generated by the gas mixture generator is supplied to a target space using the air pump.

7. A container refrigeration apparatus, comprising:
a casing mounted on a container;
components of a refrigerant circuit attached to the casing; and
an inside air control system attached to the casing, wherein
the container refrigeration apparatus is configured to cool an internal space of the container, and supply a gas mixture to the internal space of the container using the inside air control system, and
the inside air control system is the inside air control system of claim 6.

8. An inside air control system, comprising:
a gas supply device comprising:
  a gas passage that supplies air to a target space;
  a filter unit provided at an inlet of the gas passage; and
  an air pump provided in the middle of the gas passage; and
a gas mixture generator that generates a gas mixture having a higher nitrogen concentration and a lower oxygen concentration than air sucked through a filter unit of the gas supply device, wherein
the filter unit comprises:
  a filter box; and
  an air filter housed in the filter box, wherein
  the air filter is arranged to be spaced apart from wall surfaces of the filter box,
  an air intake port is formed in an air intake surface, which is one of surfaces of the filter box, and
  a space which is present between the air intake surface provided with the air intake port and an air inflow surface of the air filter corresponding to the air intake surface is a primary space through which the air flows into the air filter, and a plurality of spaces, each of which is present between one of surfaces of the air filter other than the air inflow surface and an associated one of the wall surfaces of the filter box, are secondary spaces into each of which the air flows out from the air filter, and
gas generated by the gas mixture generator is supplied to a target space using the air pump.

9. A container refrigeration apparatus, comprising:
a casing mounted on a container;
components of a refrigerant circuit attached to the casing; and
an inside air control system attached to the casing, wherein
the container refrigeration apparatus is configured to cool an internal space of the container, and supply a gas mixture to the internal space of the container using the inside air control system, and
the inside air control system is the inside air control system of claim 8.

10. An inside air control system, comprising:
a gas supply device comprising:
  a gas passage that supplies air to a target space;
  a filter unit provided at an inlet of the gas passage; and
  an air pump provided in the middle of the gas passage; and
a gas mixture generator that generates a gas mixture having a higher nitrogen concentration and a lower oxygen concentration than air sucked through a filter unit of the gas supply device, wherein
the filter unit comprises:
  a filter box; and
  an air filter housed in the filter box, wherein
  the air filter is arranged to be spaced apart from wall surfaces of the filter box,
  an air intake port is formed in an air intake surface, which is one of surfaces of the filter box,
  a space which is present between the air intake surface provided with the air intake port and an air inflow surface of the air filter corresponding to the air intake surface is a primary space through which the air flows into the air filter, and a plurality of spaces, each of which is present between one of surfaces of the air filter other than the air inflow surface and an associated one of the wall surfaces of the filter box, are secondary spaces into each of which the air flows out from the air filter, and
  the air intake port is formed in a lower portion of the air intake surface of the filter box, and
gas generated by the gas mixture generator is supplied to a target space using the air pump.

11. A container refrigeration apparatus, comprising:
a casing mounted on a container;
components of a refrigerant circuit attached to the casing; and
an inside air control system attached to the casing, wherein
the container refrigeration apparatus is configured to cool an internal space of the container, and supply a gas mixture to the internal space of the container using the inside air control system, and
the inside air control system is the inside air control system of claim 10.

* * * * *